No Printed Specification Available
9594X
C. Parks.
Covering Cord.
Patented Apr. 13, 1836.
Fig. 4.
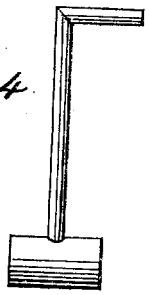
Fig. 3.
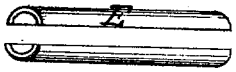
Fig. 1.
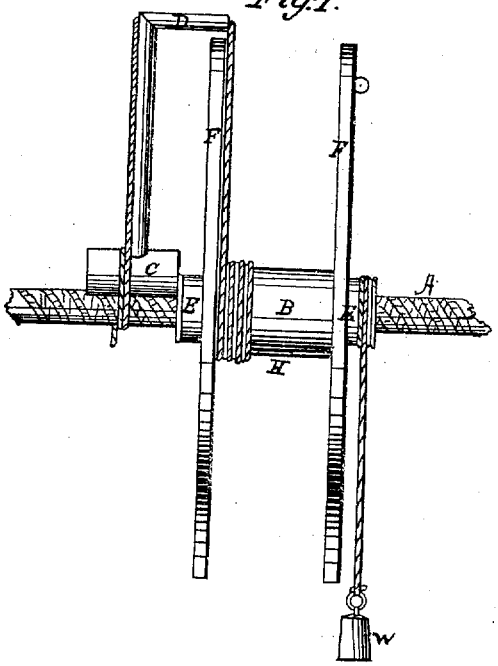
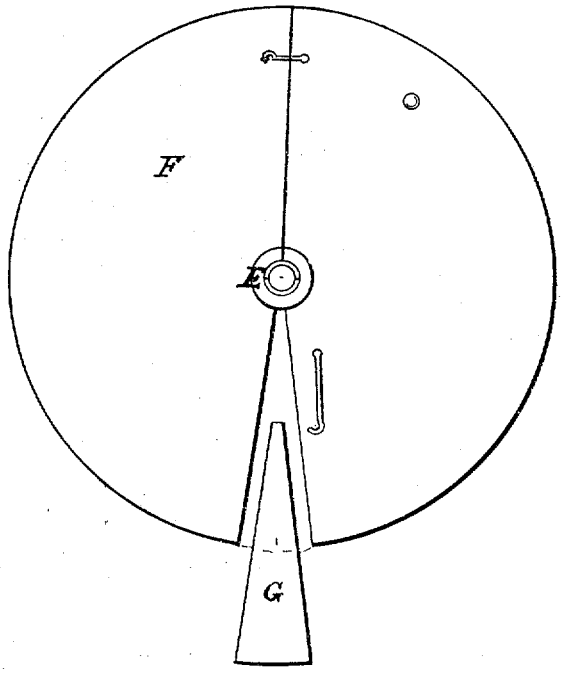
N. PETERS, PHOTO-LITHOGRAPHER, WASHINGTON, D. C.

X 9594 apl 13. 1836.

April 13 1836

Charles Parks, who has notified his intention to become a
Citizen of the United States . . . . . . . . . . .
No 283. "Improvement in a machine for serving Ropes"
Date of Patent . . . 13th April 1836
Certificate of Attorney Genl 13th April 1836

The Schedule referred to in these Letters Patent and
making part of the same, containing a description in
the words of the said Charles Park himself, of his Im-
provement in the Machine for serving Ropes"
To all to whom these shall come: Be it known
that I Charles Parks of the City, county and State of
New York, have invented a new and useful machine
and that the following is a full and exact description
thereof. Figure 1 in the annexed drawing represents a profile
view of the entire Machine in its working position on
the rope A. The serving mallet C is so constructed
as to move clear of the circular side of Reel E. B. E.
the tubular handle D, being placed horizontally con-
ducts the small cord or served Rope from the body of
the reel and lets it off upon the rope or Cable to be served
by being made to revolve round the body of the Rope or
Cable, clearing at the same time, the size of the Reel
F. the serving mallet pushing the Reel along until
the service is completed. the weight G, suspended by a
cord looped in a groove over the outer end of the reel
body is intended to regulate the motion of the machine
and to keep it steady. the Letter H, designates the
position of the hinge upon which the reel opens, to be
clasped around the rope or cable intended to be ser-
ved, in which position the Reel is secured by the
Hooks and Staple represented on the upper curve of
Figure 1. This Figure 2 represents a front view of the off side of the Machine near the weight W. Shewing
the knob or handle by which the service rope is
to be wound upon the Reel when the latter is sus-
pended upon a pin for that purpose, the letter E.
in Figure 2, designates the outer end of the Reel-
body to which the regulating weight is attached &
the yellow inside circle shews the position of the bush-
ings which are intended to reduce the internal
diameter of the Reel in order to graduate it to em-
brace different sized Ropes or Cables: the letter G.
on Figure 2. designates the triangular opening
necessary to be left in the circular sides of the Ma-
chine in order to admit of its being unclasped:
H is a slide to be secured in its position by
Hooks and Staple when the Machine is in wor-
king order. Figure 3 denoted by letter E. shews
the two parts of the graduating bushings which can
be made of any required dimensions: they are to be
placed inside the Reel-body, and secured in posi-
tion by two Hooks and Staples on the weight side
or end of the Machine. Figure 4 shews the old
serving mallet with the addition and improve-
ment made by the present applicant. It is intended
that this machine shall be constructed of all suitable
woods and metals, or a combination of both materials
The manner of using this Machine is as follows to
wit: after the rope or cable to be served is hauled
taut in the usual way the Reel is to be unclasped
and fitted upon the rope or cable, leaving the
service cord: the serving Mallet, placed in a per-
pendicular position upon the rope close against
the body of the Reel, with the service cord run through
the tubular part of the handle with three more

9594X turns around the butt of the mallet and the Rope
to be served, thereby causing the mallet to revolve
around the Cable and Reel, the serving cord will
be left upon the Cable in proportion as the Reel is
relieved. & the reel at the same time moving forward
in a ratio with the motion of the mallet. To ren
der the motion most uniform the hand of the
workman should be applied to the angle where
the tubular and solid parts of the mallet handle
meet. By using this machine the labour of one
person on every Rope to be served is saved in
asmuch as it entirely dispenses with the present
process of casting the Ball of ~~serving and worming with the Rope mallet~~

What I claim as my own invention
and not previously known in the above described
Machine is as follows to wit: every part thereof except
the butt and perpendicular or solid handle of
the serving mallet; being the body and sides of
the reel: the sawing or forming the same into two
parts joined by a hinge and fastened by hook and
staple; the handle for turning the reel when not
on the rope or Cable in order to wind the serving
cord upon the Reel the application of the [illegible]
to regulate the motion the bushings in two parts to
graduate the internal diameter of the reel: the
tubular part of the serving mallet handle to con
duct the serving cord clear of the Circular outer
side of the reel the moving slide for closing the
triangular opening in the sides of the reel and
the general application of all the parts of the
machine and serving mallet as a whole to
formed and Constructed of wood or metal, or a combination of both materials, for the purpose of business of serving ropes or cables in order to increase their strength and durability.

Witnesses

James Hoyd } Charles Parks.
James Walker } 1050

Drawing